May 19, 1959 E. M. P. LEROY 2,887,570
RAILWAY TRACK CIRCUIT-SIGNALLING SYSTEM
Filed Aug. 25, 1955 2 Sheets-Sheet 1
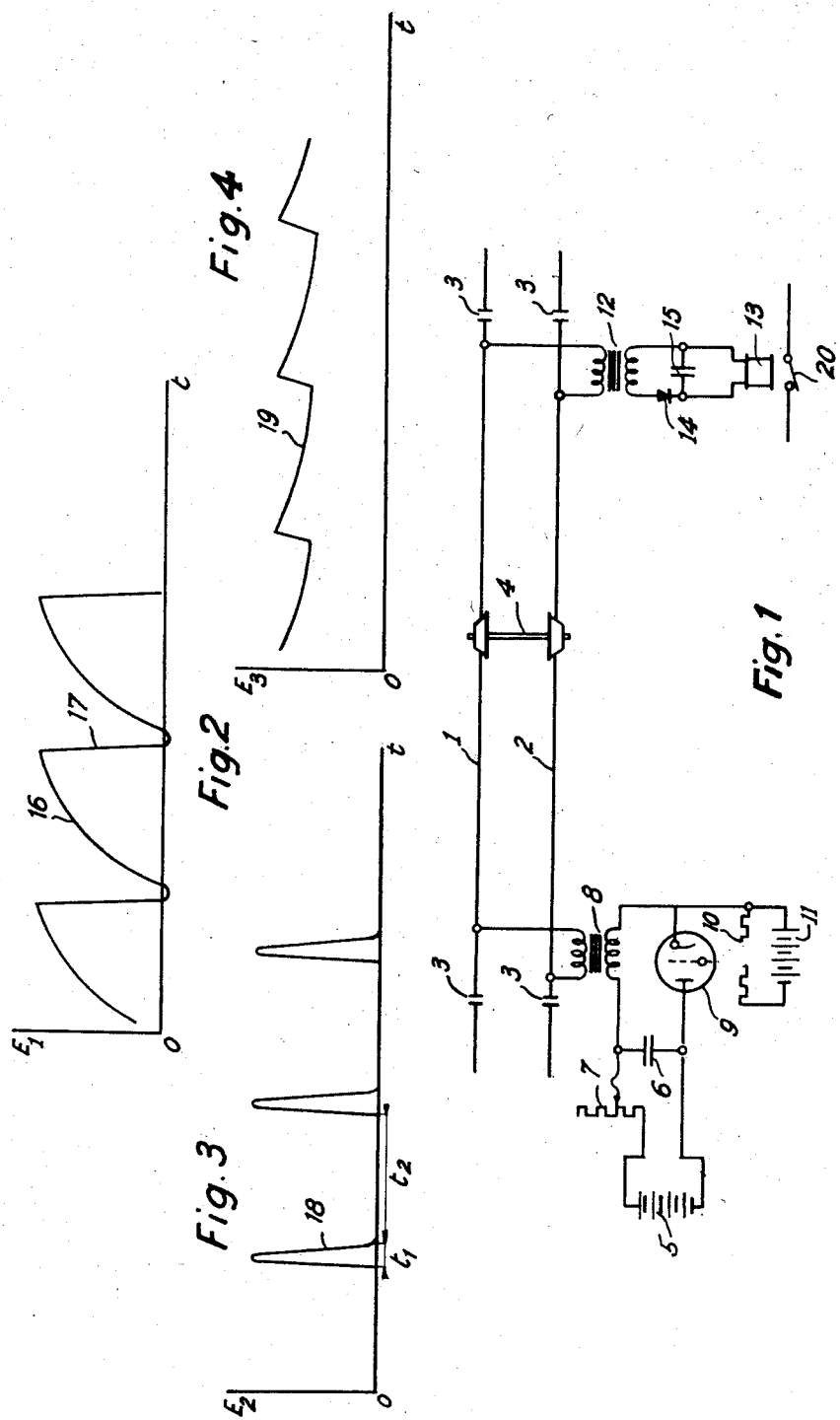

May 19, 1959  E. M. P. LEROY  2,887,570
RAILWAY TRACK CIRCUIT-SIGNALLING SYSTEM
Filed Aug. 25, 1955  2 Sheets-Sheet 2
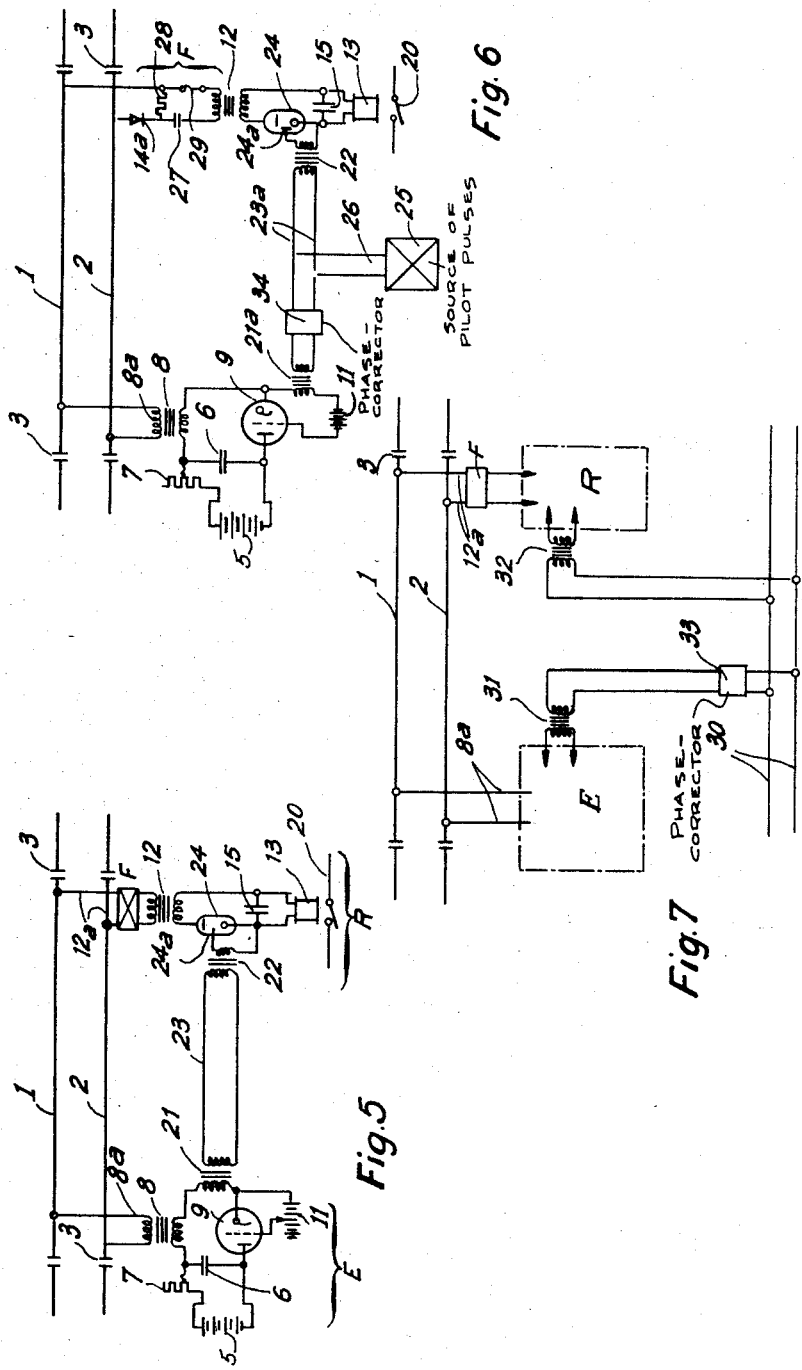

United States Patent Office 2,887,570
Patented May 19, 1959

2,887,570

RAILWAY TRACK CIRCUIT-SIGNALLING SYSTEM

Emile Marcel Pierre Leroy, Eaubonne, France

Application August 25, 1955, Serial No. 530,593

Claims priority, application France September 10, 1954

5 Claims. (Cl. 246—34)

This invention relates to improvements in signalling systems used on railways and known as "track circuit" systems.

In these systems, the presence of a train or vehicle upon a given section of the track is signaled by the axles of the train or vehicle establishing an electrical connection or "shunt" between the two rails, which causes the release of a track-relay armature which is normally energized.

It may happen, for various reasons, for example under the effect of the running of light vehicles (rail cars or trolleys) or when the track sections are faulty (due to a layer of sand or other insulating material on the head of the rails), that the shunt is of too high resistance to bring about the release of the track relay. This condition may cause disturbances or even accidents.

It has already been proposed to improve the efficiency of the shunting of the rails by means of high voltage impulses capable of breaking down the resistance or insulating film which may appear on the rails. These impulses are generated by the interruption of greatly inductive circuits similar to the ignition coils of automobile engines.

However, these known arrangements have not been able to result in practical applications, principally because of the very large quantities of power which are necessary to assure the operation of such track circuits and in view of the practical impossibility of operating them correctly, because of the need of such power.

This invention has as its principal object the elimination of these difficulties and to permit the practical and simple application of high voltage impulses utilizing suitable means for the closing pulse generating circuit instead of the usual means of generating pulses by interruption of the circuit. It also has as its object the considerable reduction of the duration of the impulses and the quantities of power or energy which are employed during the course of the operation of the new and novel track circuits, as well as a reduction of the average or mean power applied to these circuits. Another object of the invention is to provide a very simple, economic and positive means permitting the use of only one track relay of the regular or standard type, operating under normal conditions. The invention has also for its object the provision of means which eliminate all undesirable external influence on the track circuits, liable to disturb their operation. Other objects and advantages of the invention will appear from the following description.

According to the invention the signalling system comprises on the input side means for generating spaced unidirectional rapidly rising voltage pulses of very short duration and of low energy, having a peak value which is sufficient to break down any contact resistance which may normally appear between the rails and the vehicle wheels, and on the output side a track relay with an interposed receiver for said voltages. This receiver includes an energy-accumulating device adapted to maintain said track relay on its normal energized position in the absence of vehicles in the track section.

The voltage pulses are generated by an intermittent or periodically conductive circuit-closing device supplied by a source of direct current, the frequency of operation of said device being sufficient to maintain said track relay normally energized.

In the examples hereinafter described, this pulsating voltage is furnished by means of an electronic circuit closing device adapted for rapidly discharging a condenser, while the track relay is connected to the track circuit through an energy-accumulating circuit which allows the relay to remain in energized position during the time interval between two successive voltage pulses. In order to eliminate all external undesirable effects upon the operation of the track circuits, the invention provides suitable coupling connections between the transmitter and the receiver of the voltage pulses.

The invention is hereinafter described with reference to the accompanying drawings, in which, Fig. 1 is a diagram of a track circuit operated by a pulsating voltage in accordance with the invention.

Fig. 2 represents the curve of the voltage variation at the terminals of the primary winding of the transformer feeding the track circuit, as a function of time.

Fig. 3 represents the wave-form of the voltage variation at the terminals of the secondary winding of the transformer feeding the track circuit, as a function of time.

Fig. 4 represents the wave-form of the voltage variation at the terminals of the track relay, as a function of time.

Fig. 5 is a diagram of a track circuit provided with inductive coupling means between the receiver and transmitter.

Fig. 6 is a modification of Fig. 5, in which synchronization between the transmitter and receiver is ensured by an auxiliary transmitter.

Fig. 7 is another modification of the circuit shown in Fig. 5, in which synchronisation is ensured by a common feed line.

As shown in Fig. 1, a track circuit comprises a pair of rails 1 and 2, which may be separated or isolated from the corresponding rails of adjacent track sections by insulating joints 3. The rails 1 and 2 may be shunted by one or more axles 4 of a train or vehicle present in the section.

At the input side of the track circuit, the current supply is provided by a direct-current source 5, the output of which can be regulated by a rheostat 7 or equivalent device.

The current thus adjusted is applied to charge a condenser 6, which is connected to an intermittent discharge circuit, the latter comprising the primary winding of a transformer 8 connected in series with an intermittent circuit-closing device 9.

In the example shown, the circuit-closing device is a thyratron, the grid of which is biased by a direct-current source 11, and the voltage of which is regulated by a potentiometer 10. It is to be understood that the grid circuit may be arranged in any other suitable manner.

The input end of the track circuit is connected to the secondary winding of the transformer 8 and the output end of the track circuit is connected to the primary winding of a transformer 12, the secondary winding of which is connected to the terminals of a track relay 13. A rectifier 14 is provided in series with the relay and a condenser 15 in parallel therewith beyond the rectifier. As usual, the track relay 13 operates one or more contacts 20 of a number of signalling circuits. The winding of the track relay 13 may be of the same type as is customary for direct current, but it is preferably designed to have a relatively high impedance.

The operation of the apparatus thus described is as follows: The condenser 6 is constantly charged by the adjusted current from the source 5, and the voltage $E_1$ at the terminals of this condenser increases gradually as a function of time, as represented by the rising portion 16 of the curve in Fig. 2. When this voltage $E_1$ reaches a predetermined value the circuit-closing device 9, the grid voltage of which is suitably adjusted by the potentiometer 10, operates to allow the sudden discharge of current from the condenser 6.

This discharge is represented, as a function of time, by a sudden fall of voltage along the portion 17 of the curve in Fig. 2, and it induces in the secondary winding of the transformer 8 rapidly rising voltage pulses as represented in Fig. 3 by corresponding very narrow peaks 18. These voltage peaks 18, created periodically, for example, several times per second, have a considerably shorter duration $t_1$ than the intervals $t_2$ between them, which correspond to the charging periods of the condenser 6.

In the absence of any bridging of the rails by an axle such as 4, these voltage peaks or pulses 18 are propagated along the rails 1 and 2 with some degree of attenuation, and they energize periodically the output transformer 12. The voltages induced in the secondary winding of this transformer feed the energy-accumulator constituted by the condenser 15, which due to the presence of the rectifier 14 can discharge only into the winding of the track relay 13. The voltage $E_3$ appearing at the terminals of the relay 13 has a saw-tooth wave-form, as represented by the curve 19 in Fig. 4. This voltage always has a positive value, so that the relay armature 20 (see Fig. 1), constantly urged toward its open or drop-out position by suitable means (not shown) remains continuously attracted by a direct current of saw-tooth or undulating wave-form.

When the track is shunted by a vehicle axle 4, as shown in Fig. 1, the peak voltage of the periodic pulses 18, which may be of the order of 60 to 100 volts for example, is always sufficient to break down any contact resistance appearing, even in the most unfavorable contact conditions between rails and wheels. There is thus always produced by the vehicle a sufficient shunting effective to cause with certainty the release of the armature 20 of the track relay 13 to its drop-out position. Trials have shown in fact that the voltage $E_3$ becomes practically zero, whatever may be the condition of the track, and whatever may be the nature of the vehicle producing the shunt. It will be noted that this very advantageous result cannot be attained by the usual low-consumption direct current track circuits.

Inasmuch as the duration $t_1$ of the voltage pulses is also much shorter than the duration of the intervals of time $t_2$, the electrical constants of the various circuits being selected with this end in view, the energy of each pulse is low, and the average power necessary for feeding such a track circuit remains of the order of a hundred watts, for example, which is quite acceptable in railway signalling systems, in spite of the relatively high instantaneous power which is developed at the establishment of the voltage peaks 18, this power being sufficient to produce with certainty the effective shunting of the track circuit by disruptive discharges between the wheels and the rails.

It will be noted likewise that the possible failure of any element of the device described will result in producing the release of the relay armature 20 to its drop-out position, so that the device complies completely with the safety rules which have to be observed in signalling systems.

It will be understood that the circuit-closing means for producing disruptive voltage pulses might be purely mechanical, electro-mechanical or some other type. Similarly, the device for accumulating the pulse energy at the input to the track relay might likewise be of any suitable kind and might store energy in various forms.

The track circuits which have been described are not unduly sensitive to external disturbing influences. It is, however, possible to improve their operation substantially by a more complete elimination of all external influence other than the shunting action proper, for example, by separating the effects of adjacent or superposed track circuits and those of accidental increases of voltage or perturbations of any kind.

For this purpose, the track-circuit receivers may be arranged to respond solely and selectively to predetermined pulse transmitters, as shown in the further embodiment of Figs. 5, 6 and 7.

This selective sensitivity is obtained by a synchronizing coupling between the pulse transmitters and the corresponding receivers, each of the receivers comprising a device having intermittent conductivity which is controlled to appear at the same frequency as and in phase with the pulses which are to be effective. In order to always act in the manner required by safety considerations, these arrangements may also comprise suitable filtering means.

According to Fig. 5, the receiver R comprises, in place of the rectifier 14 in Fig. 1, a switching and rectifying element 24 possessing intermittent one-way conductivity, such as an electronic or thermionic valve, a transistor, a quick-acting relay or other suitable device. In the example shown, it is constituted by a cold-cathode valve provided with a control or starting electrode 24a. The control or starting circuit connected to this electrode comprises one winding of a coupling transformer 22, the second winding of which is connected by a two-wire synchronizing and coupling circuit 23 to a winding of another coupling transformer 21, the other winding of the latter being inserted in the output circuit of the valve 9 of the transmitter E.

In operation, each pulse furnished by the transmitter E will energize the control electrode 24a, by way of the transformers 21 and 22 and the circuit 23, and will thus render the cold-cathode valve 24 conductive, the latter normally remaining non-conductive except for the duration of these pulses. It follows that the track relay 13 can only be energized if the pulses transmitted along the rails 1 and 2 by way of the transformers 8 and 12 coincide exactly with the auxiliary synchronizing pulses transmitted by the coupling transformers and circuit 23. Apart from this agreement or coincidence of the two trains of pulses, the receiver R is insensitive to external influences which might emanate, for example, from adjacent track circuits.

The arrangement described eliminates practically all undesired disturbances. It may happen, however, that an accidental transitory voltage appearing between the rails 1 and 2 may be transmitted both by the transformers 8, 21 and 22, and also by the transformer 12, in which event there will result an undesired energization of the track relay 13.

This eventuality is avoided, by following the diagram shown in Fig. 6, where the coupling transformer 21 of Fig. 5 is replaced by a transformer 21a, of which the primary winding is inserted, not in the anode circuit of the electronic valve 9, but in the grip circuit of this valve. Moreover, the source 11 of grid bias current is regulated in such a way that the discharge no longer starts spontaneously in said valve 9. The start of this discharge is controlled by an auxiliary synchronizing source 25 which is connected to a synchronizing and coupling circuit 23a, by wires 26, in order to furnish "pilot pulses."

These pilot pulses have the effect of modifying the grid bias of the valve 9 in such a way as to cause the discharge of the condenser 6 by this valve to take place at the same time as the synchronous energization of the electrode 24a of the cold-cathode valve 24 or other equivalent device, thus rendering this valve or device, conductive. By these means, the synchronization circuit 23a can no longer be operated by increases of voltage which may appear in the track circuit 1, 2. The elimination of various external influences is therefore made much more complete.

In certain cases, especially when the track circuits are of considerable length, it may be desirable to avoid the use of specific synchronization circuits such as the lines 23 and 23a. As shown in Fig. 7, it is possible to replace these synchronizing circuits by an alternating current supply line 30 running alongside the track.

In this figure, the transmitter E, represented diagrammatically by a rectangle, is connected to one extremity of the track section by connectors 8a, and the receiver R is connected to the opposite extremity of the track section by connectors 12a, this receiver R being likewise represented by a rectangle. The coupling transformers 31 and 32 are of the known type of "peaking transformers" in which the magnetic circuits present a practically rectangular magnetization curve. They are each connected by one of their windings to the transmitter E and the receiver R respectively, their other windings being connected to the two conductors of the supply line 30.

If the line 30 is connected to an alternating voltage of 50 or 60 cycles per second, for example, each of the peaking transformers 31 and 32 will furnish 50 or 60 short pulses of positive voltage and the same number of negative voltage pulses per second. The negative pulses are not utilized but the positive pulses or peaks define the moments when the valves 9 and 24 are ready to operate.

In these conditions, if the grid bias of the valve 9 of transmitter E is controlled as in Fig. 6, and becomes active under the effect of the pilot pulses furnished by the transformer 31, the discharge of the condenser 6 by this valve will start as soon as the voltage at the terminals of the condenser 6 attains a predetermined value. The same synchronizing results are thus obtained as with the means described with reference to Fig. 6, but without any specific synchronizing circuit.

In some cases, the propagation of the pulses along the rails 1 and 2 may be accompanied by dephasing phenomena; in such cases, if necessary, recourse may be had to phase-correction devices placed conveniently in the synchronizing circuits. In Fig. 7, it is possible to insert a phase-corrector 33 in the circuit connecting one of the transformers 31 or 32 to the line 30 or again in the circuits of both transformers 31 and 32. In the arrangement shown diagrammatically in Fig. 6, such a phase-corrector 34 can be placed in one of the branches of the synchronizing circuit 23a.

The arrangement of these phase-correctors can follow those used in the well-known resistance-inductance and potentiometer bridges suggested by Alexanderson in the Standard Handbook for Electrical Engineers, 7th edition, page 2110, Fig. 25, or any other equivalent device.

The means described above may in some cases be supplemented with advantage by filtering devices intended more particularly for eliminating the disturbing effects of industrial frequency voltages which may appear in the track. It is possible, in fact, for a positive half-wave of such a voltage to be presented at the anode of the tube 24 at the precise moment when its starting electrode 24a receives a positive pulse from the transformer 22 or from the peaking transformer 32. In this case, even if no pulse is transmitted by the transformer 12 (as in the case of the rails being shunted by a vehicle, for example) the track relay 13 might be energized. This possibility may be obviated by means of suitable filtering devices indicated by the letter F in Figs. 5, 6 and 7.

Inasmuch as the normal frequency of the pulses furnished by the transmitter E (which may be for example of 1 or 2 cycles per second) is much lower than the industrial frequency, which is of the order of 50 or 60 cycles per second, filtering is easy and can be effected by the conventional means known as "low-pass" filters.

By way of example, as shown in Fig. 6, the low-pass filter is composed of a rectifier 14a connected in series with a condenser 27 in the supply circuit of the transformer 12, with a discharge resistance 28 shunted across the condenser 27 and the primary winding of the transformer 12. A filtering circuit of this kind complies with the safety requirements which are obligatory in railway signalling.

The constants of the electrical circuit formed by the condenser 27, the resistance 28 and the primary winding of the transformer 12 are selected so that the condenser 27 discharges very slowly but just fast enough to be able to be recharged periodically by the normal impulse currents. This circuit having a large-time-constant practically blocks positive pulses at 50 or 60 cycles per second which might pass through the rectifier 14a, so that industrial frequency voltages remain without effect upon the track relay 13. To avoid danger of the condenser 27 breaking down, it is possible to insert a fuse 29 in its circuit, which fuse will blow when the alternating current from the transformer 12 rises to an excessive value, in case of failure of the condenser.

It is obvious that without departing from the scope of the invention as defined in the appended claims, modifications may be applied to the embodiments described and illustrated.

What I claim and desire to secure by Letters Patent is:

1. In a railway track circuit of the non-coded unidirectional disruptive pulse type, in combination with a section of railway track having electrically isolated rails, means for operating the track circuit with an average power demand of relatively low value and with discrete pulses of short duration and each having a high peak voltage value comprising, a pulse generator, first means inductively coupling said generator to said rails at an input end of said track circuit, said generator comprising a pulse generating capacitor, circuit means for adjustably charging said capacitor at a desired rate to a predetermined energy level, an electronic switching device connected between said capacitor and said first coupling means, adjustable control means connected to the switching device for intermittently closing said switching device when said energy level obtains thereby to cause the capacitor to transmit unidirectional periodic pulses of a given polarity and frequency to said rails, a pulse receiver, second means inductively coupling said receiver to said rails at an output end of said track circuit, said receiver comprising a second capacitor connected so as to be charged by said pulses only through said second coupling means, unidirectional valve means of the type operable without a local power source, connected between said second capacitor and said second coupling means to control charging of said second capacitor, and a direct current track relay connected across said capacitor so as to be normally energized by discharges of said second capacitor, the electrical constants of said circuit means and said coupling means being selected in such a way that the duration of said pulses in the track-circuit is much shorter than the time interval between any two successive pulses.

2. In a railway track circuit of the type operated by non-coded unidirectional operative pulses having a relatively high disruptive voltage, in combination with a section of railway track having electrically isolated rails, an arrangement for operating the track circuit with an average power of relatively low value comprising, a pulse generator, first coupling means inductively coupling said generator to the rails at an input end of said track circuit, said generator comprising a pulse generating capacitor, an adjustable power circuit for slowly charging said capacitor at a desired rate to a predetermined level, a discharging circuit comprising an electronic switching device connected between said capacitor and said generator coupling means, adjustable control means and a control circuit for intermittently closing said switching device when a desired charging voltage of said pulse generator obtains thereby to cause said capacitor to discharge with a desired frequency through said first circuit means into the rails of said track circuit, a pulse receiver, second coupling means inductively coupling said receiver to the output end of said track circuit, said receiver comprising a second capacitor connected to said second coupling means so as to be charged only by said operative pulses received from said rails, unidirectional valve means of the type operable without a local power source, connected between said second capacitor and second coupling means to control charging of said second capacitor, and a direct current track relay connected across said second capacitor so as to be energized by a resulting sawtooth voltage of said second capacitor, and the electrical constants of said charging circuit, discharging circuit, coupling means and switching device being selected to obtain discrete pulses of high instantaneous voltage levels and of short duration time spaced at relatively long intervals so that the duration of the pulses is a relatively small fraction of the time interval between successive pulses.

3. In a railway track circuit according to claim 2, in which said unidirectional valve means in the receiver is an electron discharge device having a cathode electrode and a control electrode, synchronizing means to render said receiver responsive to pulses in said rails corresponding only to the pulses transmitted by said pulse generator, comprising a first coupling transformer having a winding connected in series with said pulse generator, a second coupling transformer having a winding connected between said cathode electrode and said control electrode of the unidirectional valve means, each of said transformers having a second winding, connections between said second windings, thereby to render said electron discharge device conductive only during intervals of time corresponding to the duration of the individual operative pulses produced by said generator.

4. In a railway track circuit according to claim 2, in which said electronic switching device of the pulse generator has a first cathode electrode and a first control electrode, and said unidirectional valve means in the receiver is an electron discharge device having a second cathode electrode and a second control electrode, synchronizing means to render said receiver responsive to pulses in said rails corresponding only to the pulses transmitted by said pulse generator, comprising a first coupling transformer having a winding connected between said first cathode and control electrodes of said pulse generator, a second coupling transformer having a winding connected between said second cathode electrode and said second control electrode of the unidirectional valve means, each of said transformers having a second winding, connections between said second windings thereby to render said electron discharge device conductive only during intervals of time corresponding to the duration of the individual operative pulses produced by said generator, a source of periodic pilot control pulses connected between said secondary windings for applying synchronizing pulses to said pulse generator and to said unidirectional electronic device to render said device intermittently conductive in synchronism with the pulses emitted by said generator, and a phase correcting device connected between said first transformer and the source of pilot pulses for equalizing the phases of the pilot pulses in said second windings, whereby the electronic device is rendered conductive for periods of time in exact synchronism with the periods of duration of said pulses emitted by said pulse generator.

5. In a railway track circuit according to claim 2, in which said second means inductively coupling the receiver to said rails comprises filter means constructed to preclude transient and industrial frequency currents in the rails from affecting said receiver.

References Cited in the file of this patent

UNITED STATES PATENTS

| | | |
|---|---|---|
| 2,043,768 | Nicholoson | June 9, 1936 |
| 2,123,965 | Rees | July 19, 1938 |
| 2,279,981 | Girardin | Apr. 14, 1942 |
| 2,379,512 | Field | July 3, 1945 |
| 2,393,135 | Agnew | Jan. 15, 1946 |
| 2,424,319 | Keimmerer et al. | July 22, 1947 |
| 2,480,160 | Poylo | Aug. 30, 1949 |
| 2,515,868 | Gilson | July 18, 1950 |
| 2,541,879 | Martin | Feb. 13, 1951 |
| 2,554,006 | Brannen | May 22, 1951 |
| 2,554,460 | Hillig | May 22, 1951 |